Dec. 18, 1956   J. S. BENTLEY   2,774,382
GUIDING CONDUIT
Filed June 12, 1953
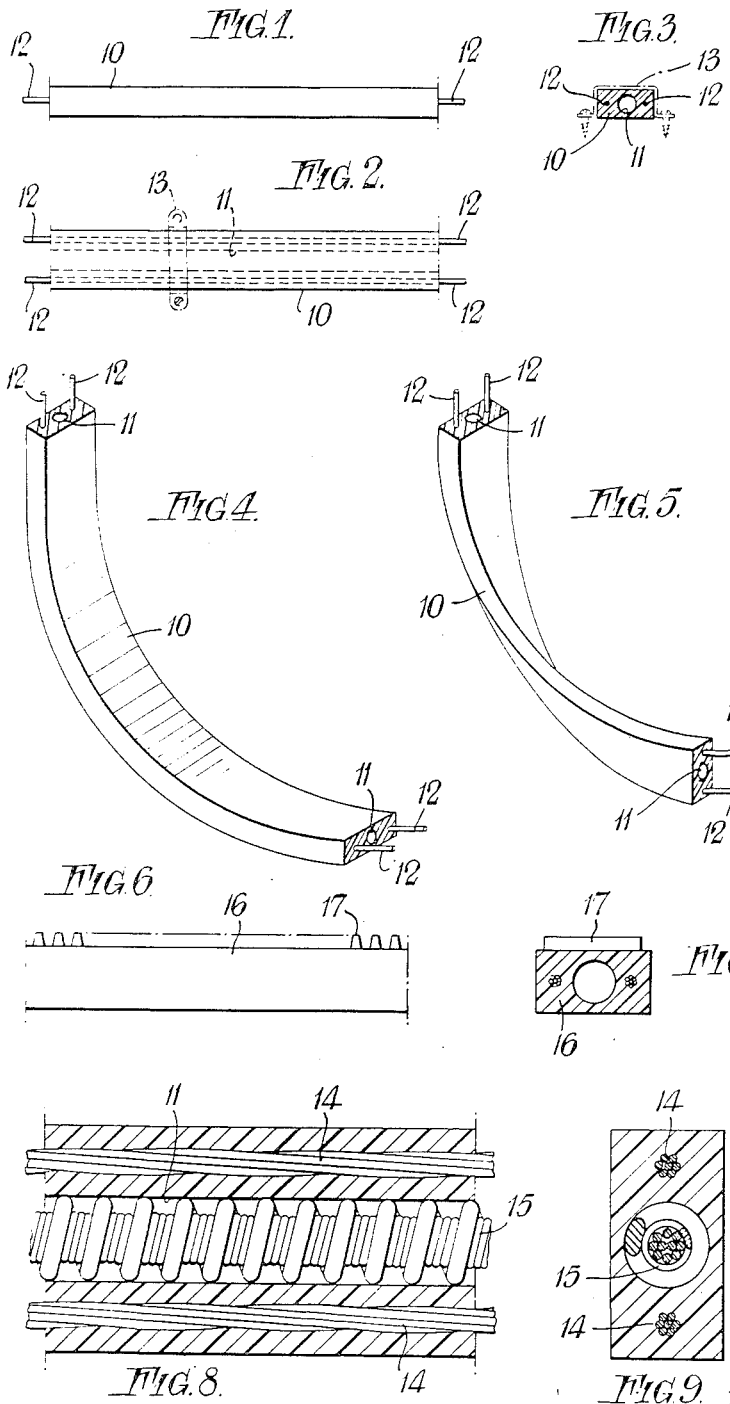
Inventor
James Sydney Bentley
By: Olson & Trexler attys

United States Patent Office 2,774,382
Patented Dec. 18, 1956

2,774,382

GUIDING CONDUIT

James Sydney Bentley, London, England, assignor to Teleflex Incorporated, Wilmington, Del., a company of Delaware Application June 12, 1953, Serial No. 361,377

5 Claims. (Cl. 138—56)

The present invention relates to novel guiding conduits especially useful for control cables of the push-pull type or rotary type, and also useful for certain flexible rotary drive shafts.

Guiding conduits of the above described type have generally been made from metallic materials and have been relatively complicated and expensive to manufacture and to install. It is, therefore, a primary object of the present invention to provide novel guiding conduits which are relatively easily manufactured and installed and which are relatively inexpensive.

Another object of the present invention is to provide a simple and novel guiding conduit of the above described general type which, while being relatively inexpensive, has operating characteristics comparing favorably with the more complex and expensive conduits heretofore known in the prior art.

Still another object of the present invention is to provide a novel conduit of the above described general type which may be designed to be held in a fixed position or to have movement along a cable disposed therein.

In accordance with the present invention, such a guiding conduit is formed from a plastic material (which can by flexed and bent) by extrusion or moulding and has incorporated longitudinally of its length at least one wire, thread, cord or the like arranged parallel to the axis of the bore of the conduit, to keep its length constant and to resist extension thereof.

Such conduit, whatever its cross section, with its integrated reinforcement and flexible or bendable characteristics, can be laid in any desired path, that is, it can be bent to pass round corners with a radius of bend (above a minimum radius) and can even in such circumstances, for example when of rectangular section, change its plane of laying without impairing the sliding movements of the cable therein.

Preferably, each interior reinforcing wire, thread or the like (which may be a multiple wire or thread) has on its exterior serrations, undulations or otherwise so that the moulded or extruded plastic definitely bonds therewith to enhance the integration of the whole.

In some cases, the conduit may be designed to have movement over the interior cable and for this purpose can have teeth moulded by extrusion or otherwise on its exterior, or otherwise formed or attached thereto, so that it can be engaged by control means for the purpose concerned.

Again, owing to the nature of its material and method of manufacture, the conduit can have attached thereto during its manufacture or subsequent thereto, various fittings either for its attachment in position or for the cooperation of other parts therewith.

In order that the invention may be better understood, it will now be described with reference to the accompanying somewhat diagrammatic drawings which are given by way of example only and in which:

Fig. 1 shows in side elevation, Fig. 2 in plan and Fig. 3 in end view, a portion of a conduit made according to one method of carrying the invention into effect.

Fig. 4 shows a perspective view of a portion of the guiding conduit such as shown in Figs. 1 to 3, to illustrate how it can be bent.

Fig. 5 shows a similar view to Fig. 4 but showing in addition how such conduit can be both bent and twisted.

Fig. 6 shows in side elevation and Fig. 7 in end view and to a larger scale, a conduit similar to that shown in the preceding figures but with an addition thereto.

Fig. 8 shows in sectional plan and Fig. 9 in end view and to a still larger scale, a portion of a conduit such as shown in Figs. 1 to 5 with a flexible multi-stranded push and pull control cable of the kind known by the registered trademark "Teleflex" mounted to slide therein.

In Figs. 1 to 5 of the drawings, the conduit 10 of extruded or moulded plastic material is of rectangular section and has symmetrically disposed therein the bore 11 for the passage of the flexible metallic cable. During manufacture the conduit has integrated therewith inextensible reinforcing wires 12 which come in the material of the conduit in symmetrical positions on each side of the bore 11. That is to say, as shown, there is a wire between the bore and each narrow edge of the conduit.

It will be understood that with the flexing and bending characteristics the conduit as shown can be laid in any desired path which can include bends. Such an ordinary bend is shown in Fig. 4 and it will be realised that such bending, from a minimum radius upwards, although of course it imposes some additional friction on the movable cable, does not prevent the sliding action of the cable.

As, in laying a conduit as illustrated in Figs. 1, 2 and 3, it may be necessary to change its plane of laying. Fig. 5 shows how this may be done by a twist at the bend.

Any suitable means may be provided for holding the laid conduit in position, which obviously will vary according to the precise application. It may, for example, be held in position by a series of suitably disposed straps or clips such as 13 shown in Figs. 2 and 3.

The reinforcing wires such as 12 may be single wires and these if desired can have matt surfaces or they can be otherwise roughened or serrated so that they more readily bond themselves with the material of the conduit. In most cases, however, each wire is formed as a multiple wire so that the exterior helical grooves form such bonding means. Such a construction is shown in Figs. 8 and 9 where flexible and inextensible multiple wires 14 are moulded in position in the conduit.

In these figures also, a "Teleflex" cable 15 operating by both push and pull is shown mounted for sliding action in the bore 11.

In some cases, the conduit may be included in a structure of the type where the conduit or a part thereof can slide on the cable. For this purpose, it can have integral teeth, such a construction being shown in Figs. 6 and 7 where 16 is the conduit and 17 the integral teeth moulded or otherwise formed therewith. With these teeth a suitable operating control engages so that upon the movement of the control the conduit or a portion thereof moves on the cable.

Although in the drawings the conduit is shown of rectangular section, it may be of other section; for example, of flattened oval section, or it can have one surface flat and another or others of convex form. Further, although two reinforcing wires have been shown, this arrangement may be varied according to exact circumstances. In some cases, there may be one reinforcing wire and in others more than two.

From the above description, it is seen that the present invention has provided a novel conduit which is of extremely simple construction and may be readily and economically manufactured. In addition, it is seen that by the provision of the substantially inextensible elements throughout the length of the conduit and substantially parallel to the bore therein, the plastic conduit has great resistance to stretching or collapsing and, therefore, has operating characteristics comparing favorably with the prior art metallic conduits.

While the preferred embodiments of the present invention have been shown and described herein, it is obvious that many changes may be made in structural details without departing from the scope and spirit of the appended claims.

The invention is claimed as follows:

1. A flexible guide conduit and support for an elongated flexible operating member to be housed therein and shifted relative thereto, and comprising an elongated body of flexible plastic material having a cross section presenting major and minor axes, said body having extending longitudinally therethrough a bore which is relatively small as compared to the cross section of the body along its major axis whereby to leave a substantial amount of material along the major axis of the body outside of the bore to add stiffness to the body for supporting the flexible operating member within the said bore, and an elongated reinforcing element embedded in the plastic body and extending longitudinally and substantially from end to end thereof and disposed between the bore and a narrow edge of the body for resisting stretching or collapsing of the body, the material of the body along the major axis thereof being resistant to bending therealong but facilitating bending of the body along the minor axis thereof and twisting of the body along its longitudinal axis to enable the conduit to negotiate curved installations.

2. A flexible guide conduit and support as claimed in claim 1, wherein the reinforcing element is provided with an irregular surface to provide positive interengagement between plastic material of the body and the reinforcing element.

3. A flexible guide conduit and support as claimed in claim 1, wherein a plurality of reinforcing elements are provided with at least one such reinforcing element disposed on opposite sides of the bore substantially along the major axis of the body.

4. A flexible guide conduit and support as claimed in claim 1, wherein the plastic body is of substantially rectangular cross section with the bore being substantially circular and positioned centrally thereof, and wherein there are a pair of reinforcing elements one disposed on each side of the bore and within the narrow edge of the rectangular body.

5. A flexible guide conduit and support as claimed in claim 1, wherein the body includes a plurality of outwardly projecting teeth integral therewith and spaced longitudinally therealong for cooperation with a toothed actuating member.

References Cited in the file of this patent

UNITED STATES PATENTS

| | | |
|---|---|---|
| 275,399 | Martin | Apr. 10, 1883 |
| 1,947,392 | Guntermann et al. | Feb. 13, 1934 |
| 1,969,212 | Erling | Aug. 7, 1934 |
| 2,251,308 | Washington | Aug. 5, 1941 |
| 2,268,321 | Flynn | Dec. 30, 1941 |
| 2,348,121 | Gillen | May 2, 1944 |
| 2,372,204 | Herkert | Mar. 27, 1945 |
| 2,496,785 | Finneburgh et al. | Feb. 7, 1950 |
| 2,544,119 | Wolfe | Mar. 6, 1951 |
| 2,544,120 | Wolfe | Mar. 6, 1951 |
| 2,550,669 | Brickman | May 1, 1951 |
| 2,656,225 | Saylor | Oct. 20, 1953 |